March 20, 1928.  D. J. EDWARDS  1,663,043
LINK
Filed Feb. 12, 1923
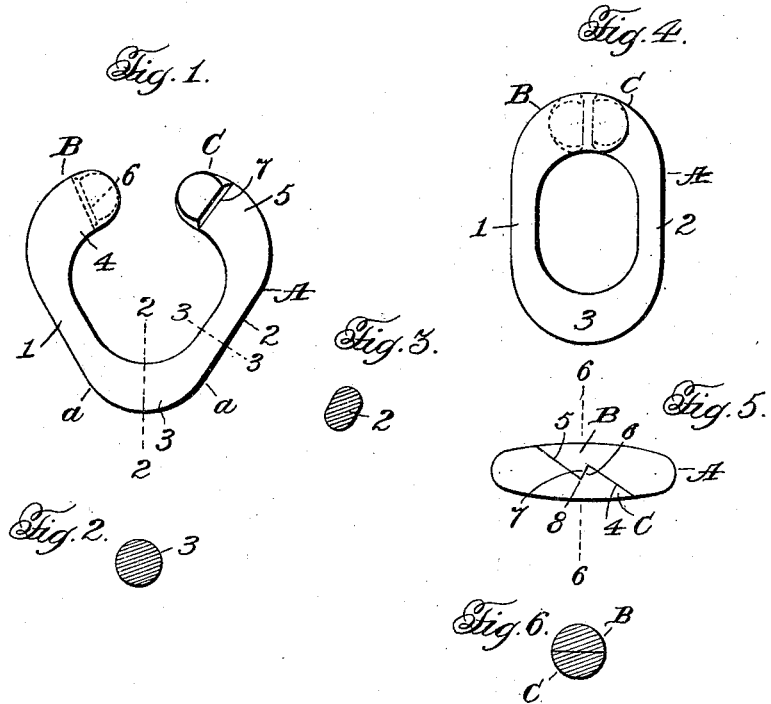

Patented Mar. 20, 1928.

1,663,043

UNITED STATES PATENT OFFICE.

DON J. EDWARDS, OF PORTLAND, MAINE, ASSIGNOR TO THE THOMAS LAUGHLIN COMPANY, OF PORTLAND, MAINE, A CORPORATION OF MAINE.

LINK.

Application filed February 12, 1923. Serial No. 618,662.

My invention relates to new and useful improvements in links and more particularly to what may be termed a snap link; the principal object of the invention residing in the construction of the link in such a manner that one end is normally open but may be closed by pressure inwardly towards the longitudinal axis, the ends of the arms at the open end being provided with tongue portions or projections adapted to be interlocked to close the normally open end of the link, and the ends of the arms being beveled so that one end will ride over the other in closing the link, the link having sufficient resiliency to allow one end of the link to ride over the other and snap into position so that the tongues or projections will interlock and be held in such position.

A further object consists in forming the ends of the link with broadened or increasing diameter portions and the arms of oval shape in cross section, the broadened or diameter increased portions at the ends adding strength at these points and allowing the arms to bend in closing at such points as not to cause breaking and the oval shape of the arms allowing the link to be closed with less effort than would be required if the arms were of the greater diameter throughout and increases the natural spring of the link which comes into play when the link is being closed, as the greater diameter of the oval is opposed to the bending torque caused by the beveled or inclined ends riding up upon each other.

With the above and other objects in view, which will appear as the description proceeds, my invention consists in the novel deceeds, tails of construction and arrangement of parts described in the following specification and illustrated in the accompanying drawings, and while I have illustrated and described the preferred embodiments of the invention as they now appear to me it will be understood that such changes may be made as will fall within the scope of the appended claims.

In the drawings:

Fig. 1 is a plan of the link open.

Fig. 2 is a section on the line 2—2 of Fig. 1.

Fig. 3 is a section on the line 3—3 of Fig. 1.

Fig. 4 is a plan of the link closed.

Fig. 5 is an end view of the link closed, and

Fig. 6 is a section on the line 6—6 of Fig. 5.

In the drawings A indicates the body of the link cast with the normally open or spaced terminal portions B and C as illustrated more particularly in Fig. 1 of the drawings. This body portion A comprises the arms 1 and 2, in cross section, which are of oval shape as shown in Fig. 3 and are connected at one end by the portion 3 which is of greater diameter than the arms, the diameter of this connecting portion 3 being illustrated in Fig. 2 of the drawings. At the opposite ends the arms 1 and 2 are beveled as shown at 4 and 5 respectively, a shoulder 6 being formed intermediate the ends of the bevel 4 and a shoulder 7 being formed intermediate the ends of the bevel 5. The beveled portions of the arms are broadened as more clearly shown in Figs. 1 and 4 of the drawings so that when the terminals are brought together by pressure, to close the link, the diameter of the end of the link, closed by the terminals, will be greater than the diameter of the arms 1 and 2 and slightly greater than the opposite or normally closed end of the link. The purpose of this increasing diameter will be presently described. The inner faces of the shoulders 6 and 7 are slightly inclined as shown at 8 in Fig. 5 of the drawings so that in closing the terminals the shoulders will properly interlock and be held in proper position.

A link constructed as above described has many advantages over the old form of open link which I will endeavor to point out. In the first place my link is so formed that the terminal ends are normally spaced a slight distance apart and are adapted to be closed merely by an inward pressure towards the longitudinal axis of the link. The terminal portions are, as described, beveled on their inner faces and each provided with a shoulder or projection, one terminal riding over the other when closing and the shoulders adapted to interlock to hold the terminals in their closed position. The body of the link is formed of sufficient resiliency so that one terminal may pass over the other and when in proper position the terminals will spring inwardly, or towards one another, so that the shoulders will interlock. By having the inner faces of the shoulders or projections slightly inclined the inward movement of the terminals will tend to draw the terminals together and securely hold them in closed position. By forming the arms 1 and 2 of oval shape as shown more particularly in Fig. 3 less effort is required in closing the link than would be required if the arms were round and at the same time the natural spring of the link is increased when the link is being closed. The long diameter of the oval is opposed to the bending torque caused by the beveled or inclined ends riding up upon each other. By forming the connecting portion 3 of greater diameter than the arms 1 and 2 the bend, in closing, will take place at the points $a$ shown in Fig. 1, and prevent bending at the center of the connecting portion 3 as would be the case if the connecting portion and the arms themselves were of the same diameter. At the same time the bending taking place at the points indicated the possibility of cracking is overcome. The diameter of the terminal end of the link is increased as shown in Fig. 6 so that when the terminals are closed, and the link is used with the standard size of chain link, its diameter is just small enough to fit into the inside of the regular chain link and this will make it impossible for the terminal ends of my link to spread open. By making the link of greater diameter at each end, than at the sides or arms, strength is added at the ends and the life of the link, where the greatest wear takes place is considerably increased.

The terminal ends of my link are normally spaced apart sufficient distance to receive therebetween links of a chain or other object, or slightly spaced eyes for connecting two objects, and when the members to be connected are in position, between the arms of my link, the arms may very easily be pressed inwardly towards the longitudinal axis of the link so that the beveled terminals will ride over one another until such a position is reached that the terminals will spring inwardly towards one another and allow the shoulders or projections to interlock. The link is also of such construction that when the terminal portions are closed this end of the link will be in the same plane or in substantially the same plane as the body of the link.

Having fully described my invention what I claim as new and desire to secure by Letters Patent is:

1. A link of the character described comprising a connecting end portion integral with opposite side portions having offset terminals formed to interlock when forced endwise towards each other into overlapping relation, the side portions having their greater diameter at right angles to the general plane of the body of the link and a substantially shorter diameter in said general plane, whereby to facilitate the forcing of the arms into overlapped relation and resist the bending of the arms out of said plane.

2. A link of the character described comprising a connecting end portion integral with opposite side portions having offset terminals formed to interlock when forced endwise towards each other into overlapping relation, the side portions having their greater diameter at right angles to the general plane of the body of the link and a substantially shorter diameter in said general plane, whereby to facilitate the forcing of the arms into overlapped relation and resist the bending of the arms out of said plane, the connecting portion of the link being relatively stronger than the side portions to prevent impairment of the connecting portion when forcing the arms together.

In testimony whereof I hereunto affix my signature.

DON J. EDWARDS.